US012806745B2

(12) United States Patent
Shih

(10) Patent No.: US 12,806,745 B2
(45) Date of Patent: Nov. 24, 2026

(54) UNIDIRECTIONAL DUAL PAWL RATCHET WRENCH

(71) Applicant: ZHEJIANG MAXTOP TOOLS MANUFACTURE CO., LTD, Wenling (CH)

(72) Inventor: Neng-Chia Shih, Changhua County (TW)

(73) Assignee: ZHEJIANG MAXTOP TOOLS MANUFACTURE CO., LTD, Zhejiang (CN)

( * ) Notice: Subject to any disclaimer, the term of this patent is extended or adjusted under 35 U.S.C. 154(b) by 281 days.

(21) Appl. No.: 18/644,929

(22) Filed: Apr. 24, 2024

(65) Prior Publication Data

US 2025/0332695 A1 Oct. 30, 2025

(51) Int. Cl.
*B25B 13/46* (2006.01)
*B25B 13/04* (2006.01)

(52) U.S. Cl.
CPC ............ *B25B 13/463* (2013.01); *B25B 13/04* (2013.01)

(58) Field of Classification Search
CPC ......... B25B 13/02; B25B 13/04; B25B 13/08; B25B 13/46; B25B 13/461; B25B 13/463; B25B 13/48; B25B 13/481; B25B 13/56; B25B 13/58; B25B 23/0042; B25B 23/02; B25B 23/142; B25B 23/16
See application file for complete search history.

(56) References Cited

U.S. PATENT DOCUMENTS 9,862,076 B2 * 1/2018 Lai ........................ B25B 13/462
10,414,028 B2 * 9/2019 Tsai ...................... B25B 13/463
2013/0269488 A1 * 10/2013 Huang .................. B25B 13/463 81/60
2015/0059533 A1 * 3/2015 Huang .................. B25B 13/463 81/62
2016/0354903 A1 * 12/2016 Huang .................. B25B 13/463
2022/0016749 A1 * 1/2022 Shih ........................ B25B 13/04

FOREIGN PATENT DOCUMENTS

TW I510334 B 12/2015

OTHER PUBLICATIONS

Machine translation of specification of TWI510334, Dec. 1, 2015.

* cited by examiner

*Primary Examiner* — Robert J Scruggs

(57) ABSTRACT

An unidirectional dual pawl ratchet wrench includes a main body, a pawl unit and a ratchet. The pawl unit has a first pawl member and a second pawl member side by side, the first and second pawl members are at least half a tooth apart at different starting positions of their toothed section, and the toothed section of one of the first and second pawl members is kept engaged with the ratchet. The surfaces on the first and second pawl members respectively have a fitting column and an engaging groove for assembly which prevents the two teeth with the same adjacent to each other loses the small-angle gear-changing driving effect, and improves the accuracy and stability of the structural composition.

4 Claims, 9 Drawing Sheets

UNIDIRECTIONAL DUAL PAWL RATCHET WRENCH

BACKGROUND OF THE INVENTION

Field of Invention

The present invention relates to a ratchet wrench, and more particularly to an unidirectional dual pawl ratchet wrench.

DESCRIPTION OF THE RELATED ART

Accordingly, ratchet wrench is a very common hand tool that can be seen in almost every household. The conventional ratchet wrenches also use the position of the ratchet block to change the direction of the ratchet transmission or idling. However, the ratchet wrench is generally used for fast steering gear drive, and the number of ratchet teeth is 72, each tooth has a rotation angle of 5°, which causes manufacture difficulties, which not only increases the production cost and quality defect rate, but also makes it difficult to ensure the engagement between the ratchet ring surface and the pawl with a relatively small tooth shape which might cause the pawl to slide off, thereby causing insufficient torque from the ratchet wrench and the pawl easily breaks.

Therefore, it is desirable to provide an unidirectional dual pawl ratchet wrench to mitigate and/or obviate the aforementioned problems.

SUMMARY OF THE INVENTION

An objective of present invention is to provide an unidirectional dual pawl ratchet wrench, which is capable of improving the above-mention problems.

In order to achieve the above-mentioned objective, an unidirectional dual pawl ratchet wrench includes a main body, a pawl unit and a ratchet. The pawl unit has a first pawl member and a second pawl member side by side, the first and second pawl members are at least half a tooth apart at different starting positions of their toothed section, and the toothed section of one of the first and second pawl members is kept engaged with the ratchet. The surfaces on the first and second pawl members respectively have a fitting column and an engaging groove for assembly which prevents the two teeth with the same adjacent to each other loses the small-angle gear-changing driving effect, and improves the accuracy and stability of the structural composition.

Other objects, advantages, and novel features of invention will become more apparent from the following detailed description when taken in conjunction with the accompanying drawings.

DETAILED DESCRIPTION OF PREFERRED EMBODIMENT

Figure 1:
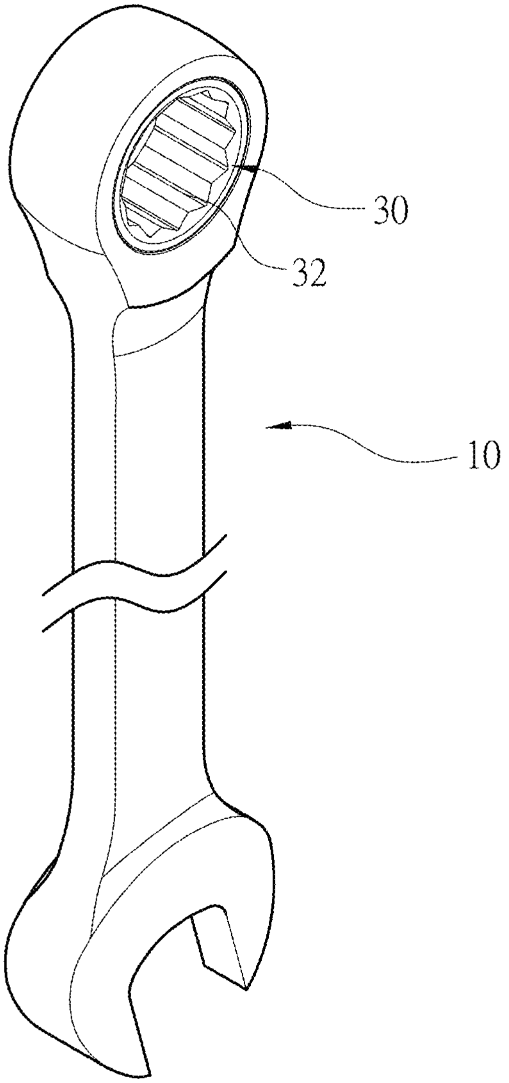
FIG. 1 is a perspective view of a preferred embodiment according to the present invention.
Figure 2:
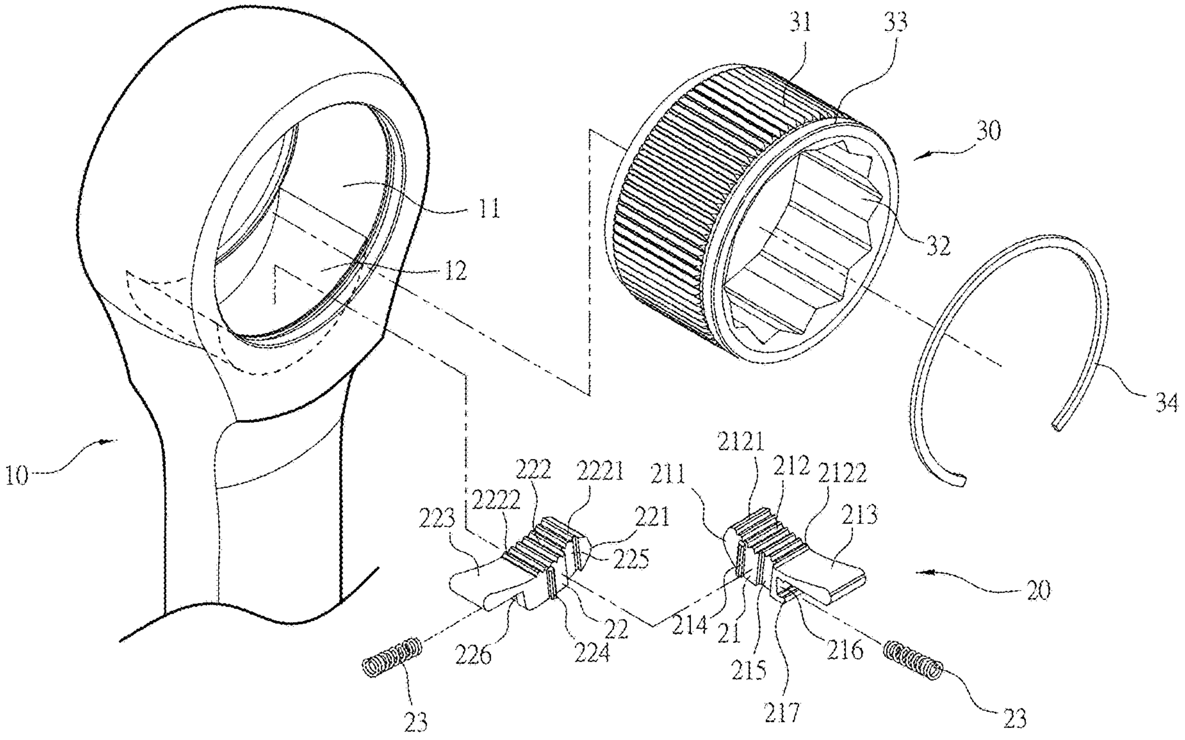
FIG. 2 is an exploded view of the preferred embodiment according to the present invention.
Figure 3:
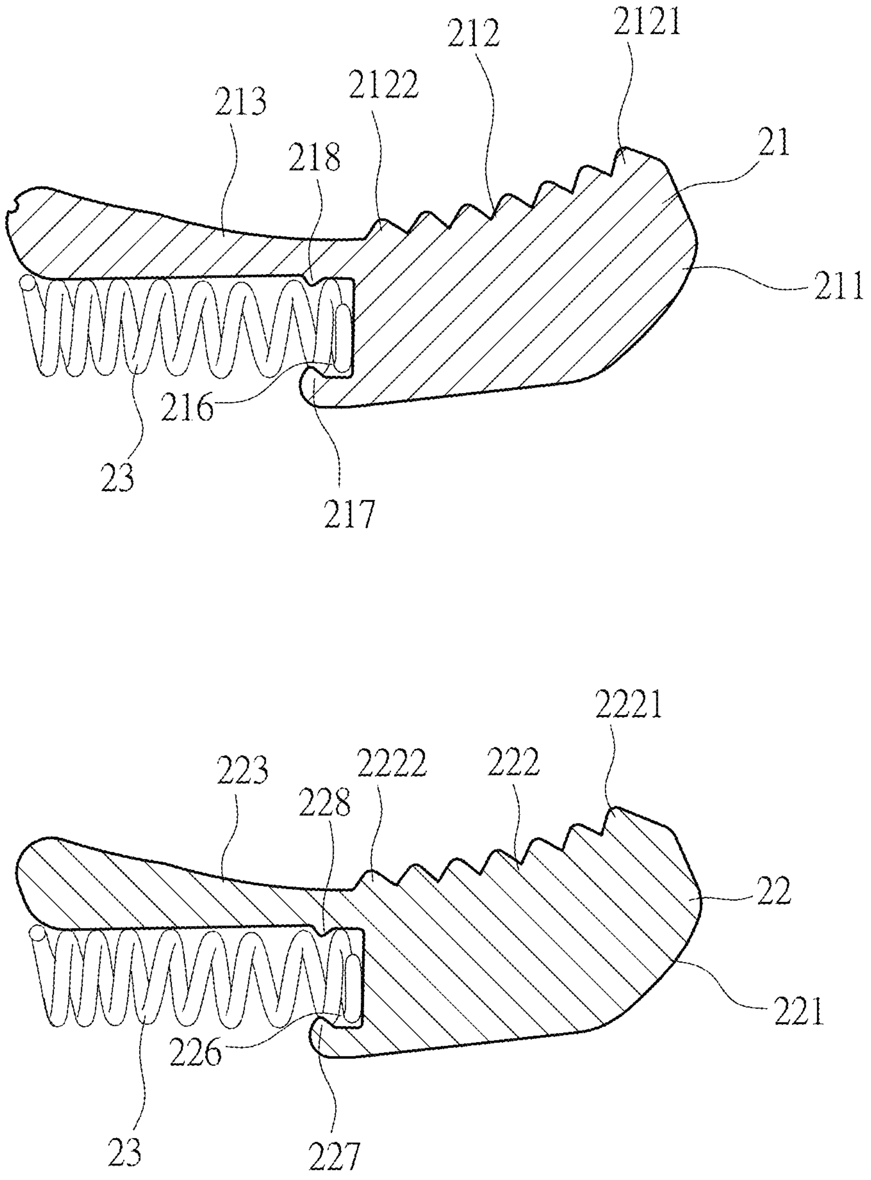
FIG. 3 is a cross-sectional view of the first and second pawl member of the preferred embodiment according to the present invention.

First, please refer to FIGS. 1-3. An unidirectional dual pawl ratchet wrench comprises; a main body 10, a pawl unit 20 and a ratchet 30. The main body 10 has a driving space 11 having a curved containing space 12. The pawl unit 20 has a first pawl member 21 and a second pawl member 22 coupled with a respective spring member 23 and mounted in the containing space 12. Each of the spring member 23 abuts an end of the containing space 12, and the first and second pawl members 21, 22 have a respective abutting end 211, 221 pushing against another end of the containing space 12. One end of each of the first and second pawl member 21, 22 are curved and have a toothed section 212, 222 and a curved section 213, 223. Arcs of the curved section 213, 223 and the toothed section 212, 222 are not identical, and the curved section 213, 223 is lower than the toothed section 212, 222. Moreover, the toothed section 212, 222 of the first and second pawl member 21, 22 are different from each other by at least a half width of one tooth such that the toothed sections 212, 222 of both of the first and second pawl members 21, 22 are in staggered arrangement when the first and second pawl members 21, 22 are aligned with each other. Each of the toothed section 212, 222 has a plurality of equiangular teeth 2121, 2221 and a non-equiangular tooth 2122, 2222 adjacent to the curved section 213, 223. A non-equiangular tooth 2122, 2222 of the toothed section has an addendum angle larger than an addendum angle of the equiangular teeth 2121, 2221, and an addendum height that is lower than an addendum height of the equiangular teeth 2121, 2221. Also, adjacent sides of the first and second pawl member 21, 22 respectively have a fitting column 214, 224 and an engaging groove 215, 225 for assembling the first and second pawl members 21, 22 in the engaging grooves 215, 225. The engaging groove 215, 225 are larger than the fitting column 214, 224 which provides offset space for the first and second pawl member 21, 22. The first and second pawl member 21, 22 respectively have an assembly slot 216, 226 below the curved section 213, 223, the assembly slot 216, 226 is further extended as a hook 217, 227 corresponding to a protrusion 218, 228 on an upper surface of the assembly slot 216, 226, and the hook 217, 227 and the protrusion 218, 228 together secure one end of the spring member to limit the spring member 23 in the assembly slot 216, 226. The ratchet 30 comprising a plurality of equiangular teeth 31 on an outer periphery and a driving hole 32, and the ratchet 30 further comprising an engaging ring groove 33 at one end coupled with a C-shaped buckle 34 for securing the ratchet

30 in the driving space, and the equiangular teeth 31 of the ratchet 30 engage with one of the toothed sections 212, 222 of the first and second pawl members 21, 22.

The composition of the above mentioned structure are shown in FIGS. 1, 2, 3, 4, and 6. The containing space 12 of the main body 10 houses the pawl unit 20, and the driving space 11 is installed with the ratchet 30, and the C-shaped buckle 34 limits the ratchet 30 in the driving space 11. The first and second pawl members 21, 22 of the pawl unit 20 push one end of the spring members 23 in the assembly slot 216, 226 against one end of the containing space 12, the abutting portions 211, 221 of the other ends of the first and second pawl members 21 and 22 are against the other end of the containing space 12, and the spring members 23 push the toothed sections 212, 222 of the first and second pawl members 21, 22 are pushed toward the driving space 11. Since the toothed sections 212, 222 of the first and second pawl members 21, 22 are staggered with each other, one of the toothed section 212, 222 of the first and second pawl members 21, 22 engage and interlock with the equiangular teeth 31 of the ratchet 30, and the non-equiangular teeth 2122, 2222 as the last teeth of the toothed section 212, 222 is lower than the other equiangular teeth 2121, 2221, so that the non-equiangular teeth 2122, 2222 and the equiangular teeth 31 are not fully engaged, thereby completing the one-way ratchet wrench structure.

Figure 6:
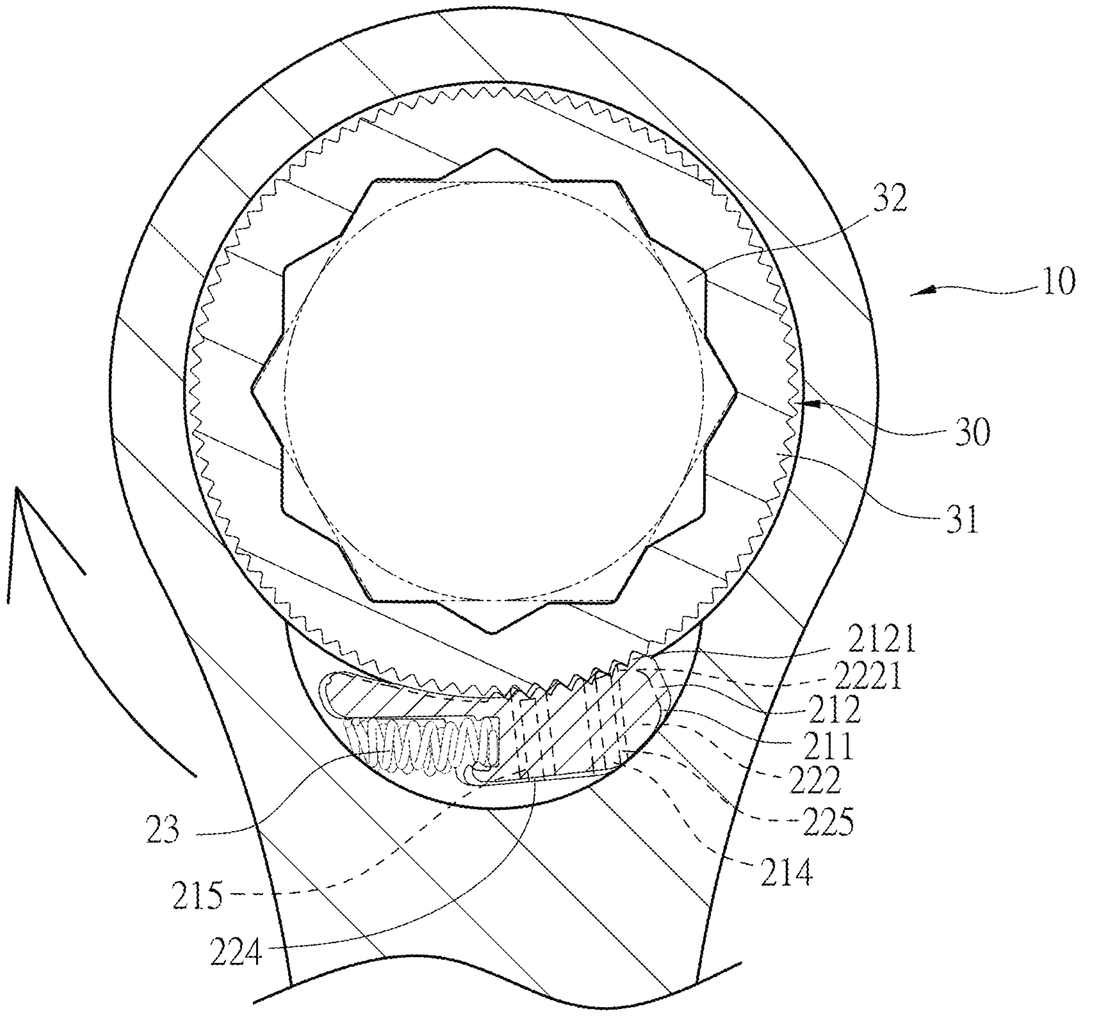
FIG. 6 is a schematic drawing of the first pawl member and the ratchet engaging in the locking operation of the preferred embodiment according to the present invention.

In actual application as shown in FIG. 6, the ratchet 30 in the driving space 11 of the main body 10 is engaged with a workpiece nut and exert force to twist the workpiece nut for locking or loosening operations. When the user holds the main body 10 and twists it clockwise to lock the workpiece nut, the ratchet 30 generates a counterclockwise rotation reaction force, since the spring member 26 is relatively located on the clockwise rotation side of the first and second pawl members 21, 22, when the ratchet 30 rotates counterclockwise, the first and second pawl members 21, 22 move upward through the push of the spring member 23, and without blocking the equiangular teeth 21 of the ratchet 30 at the same time, so that the first and second pawl members 21, 22 interactively engage with the equiangular teeth 31 of the ratchet 30. As shown in FIG. 6, the first pawl member 21 and the ratchet 30 are engaged to achieve the purpose of rotating the workpiece, thereby allowing the ratchet 30 to rotate clockwise with the main body 10 to lock the workpiece nut.

Figure 4:
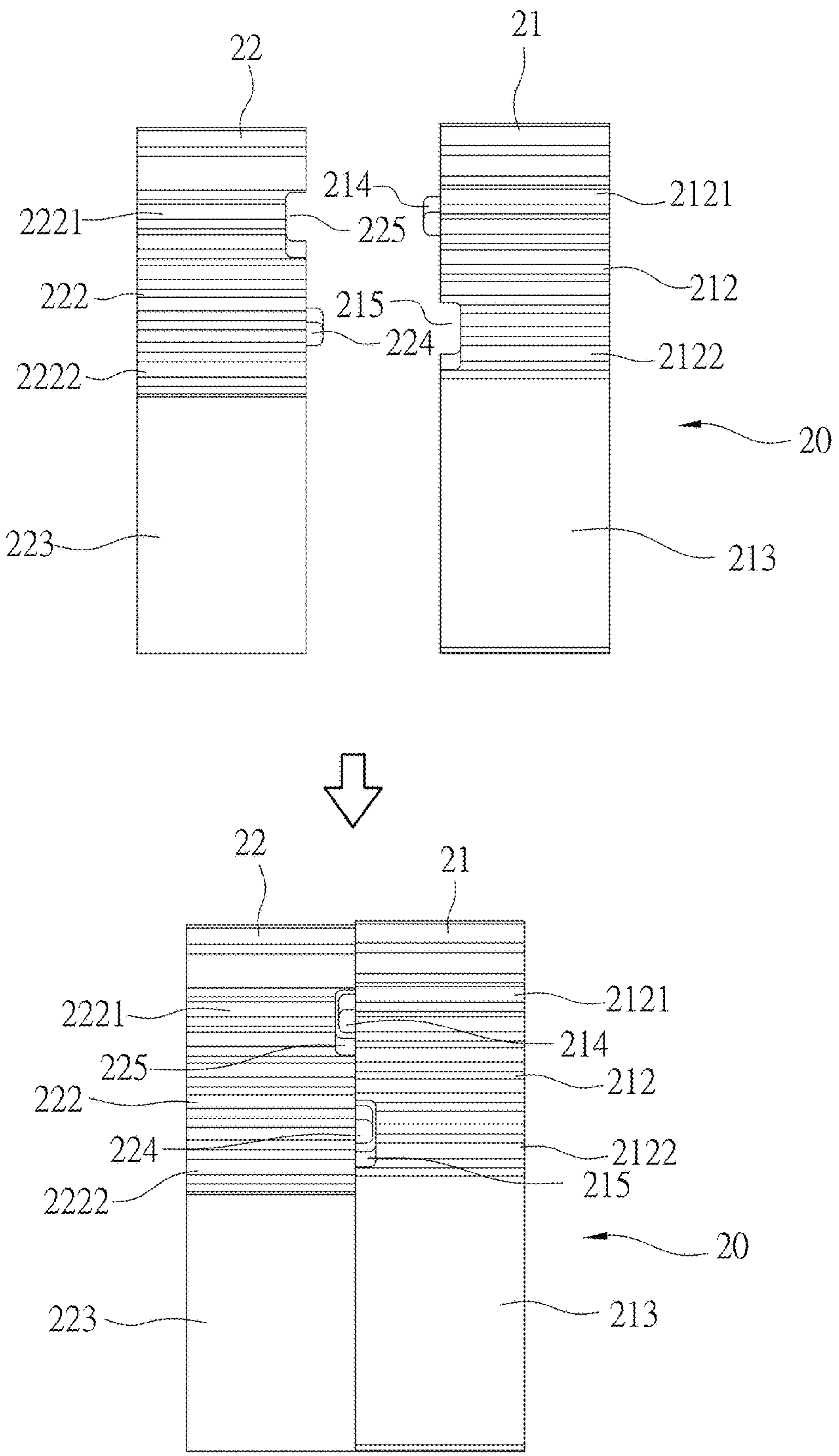
FIG. 4 is a schematic drawing of the engagement of the first and second pawl member of the preferred embodiment according to the present invention.
Figure 5:
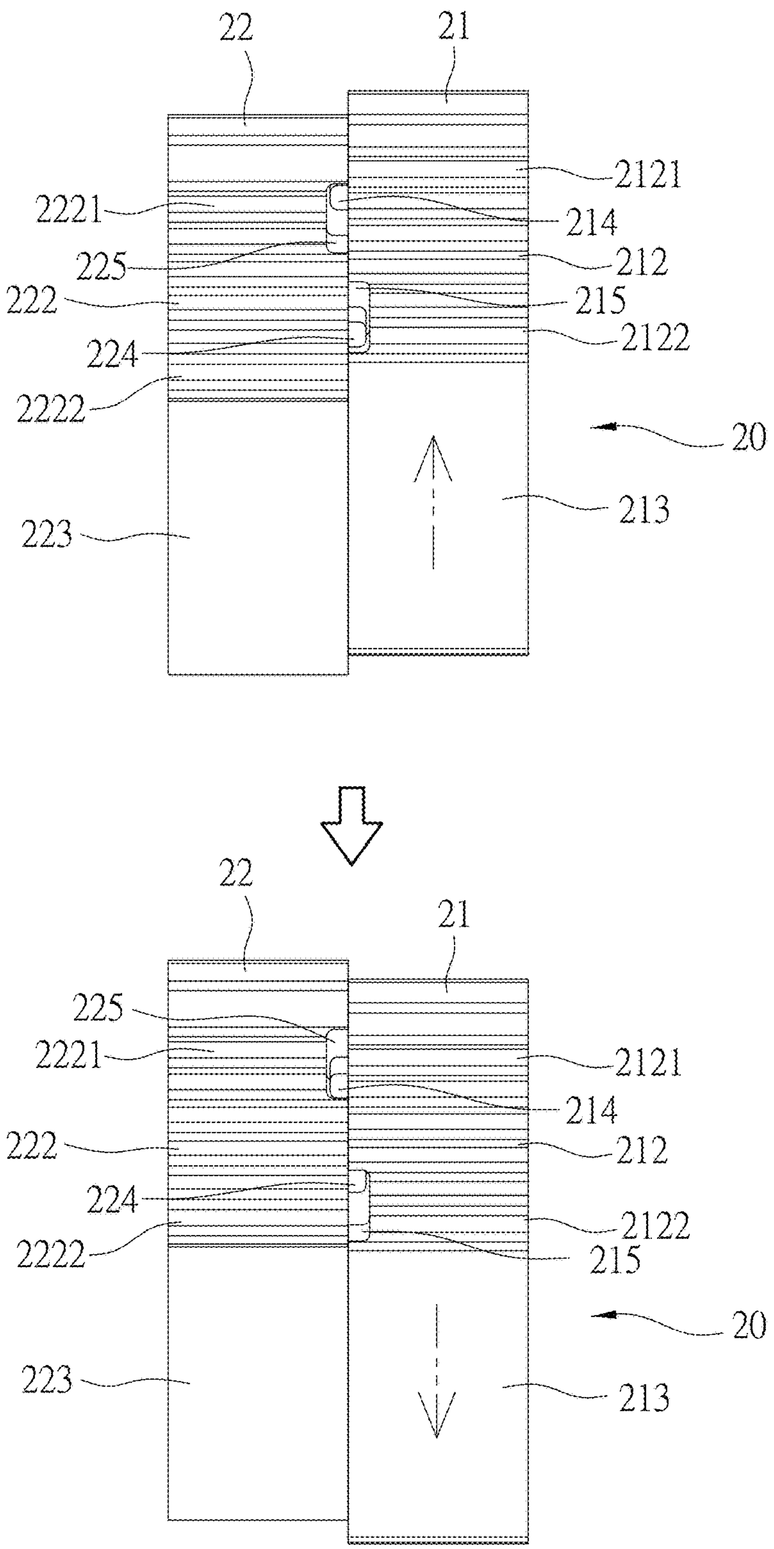
FIG. 5 is a schematic drawing of the disengagement displacement of the first and second pawl member of the preferred embodiment according to the present invention.
Figure 7:
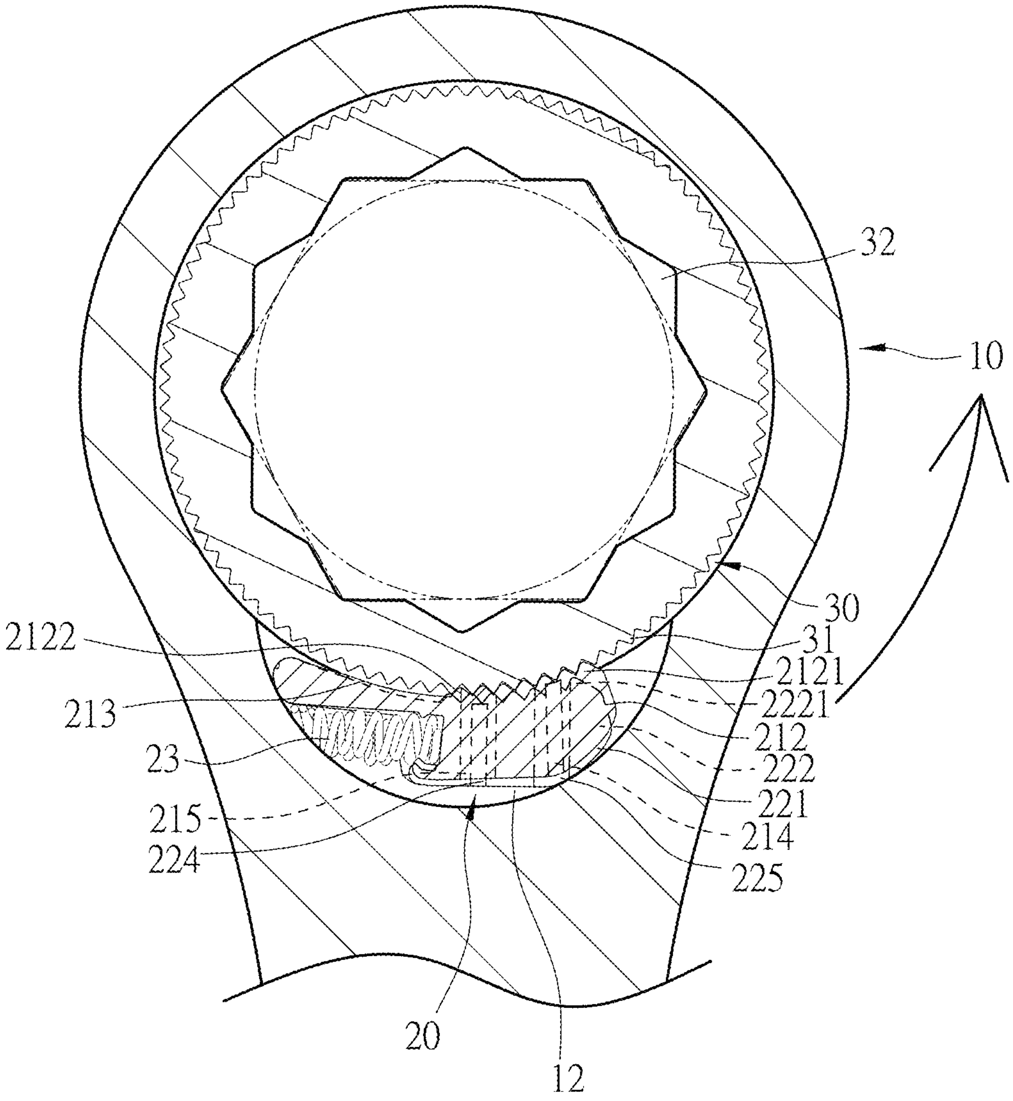
FIG. 7 is a schematic drawing of the first pawl member engaging with the ratchet and the second pawl member disengaging from the ratchet and being idle according to the present invention.
Figure 8:
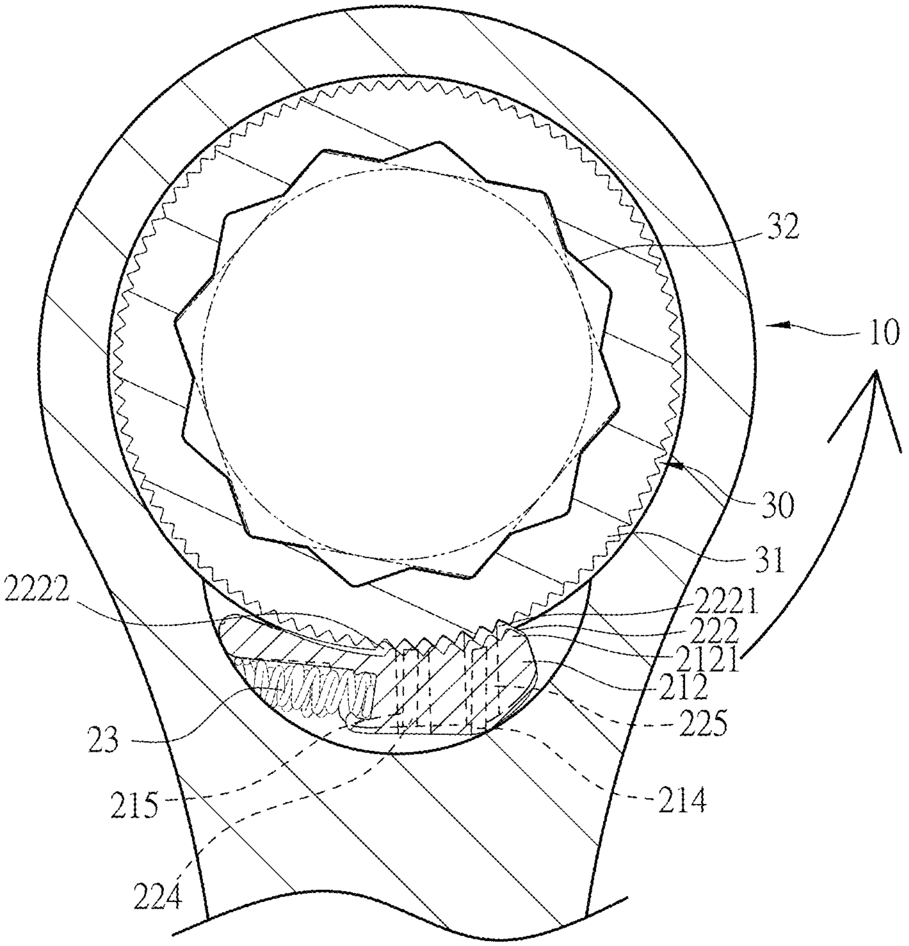
FIG. 8 is a schematic drawing of the second pawl member engaging with the ratchet and the first pawl member disengaging from the ratchet and being idle according to the present invention.

On the contrary, when the main body 10 is twisted counterclockwise, as shown in FIGS. 4, 7, and 8, since the ratchet 30 is sleeved on the workpiece nut and locked, a clockwise rotation reaction force is generated to drive the first and second pawl members 21, 22 to rotate clockwise and compress the spring member 23. Meanwhile, the first and second pawl members 21, 22 are disengaged away from the equiangular teeth 31 due to the different-angle teeth 2122, 2222, thereby reaching the non-engaging state of the first and second pawl members 21, 22 and the ratchet 30. Then with clearance fit between the fitting column 214, 224 and the engaging groove 215, 225, so that the first and second pawl members 21, 22 restrain each other when they move, and limit only half a tooth distance between the first and second pawl members 21, 22, thereby achieving the first and second pawl member 21 and 22 interact with the equiangular teeth 31 of the ratchet 30 for the purpose of interlocking and disengagement. FIG. 7 shows the engagement of the first pawl member 21 engaging and the disengagement of the second pawl member 22. FIG. 8 shows the engagement of the second pawl member 22 and the disengagement of the first pawl member 21. Accordingly, the ratchet 30 is idling state in the driving space 11 which provides the torsional reset of the main body 10, and then clockwise force is applied for a locking operator.

Figure 9:
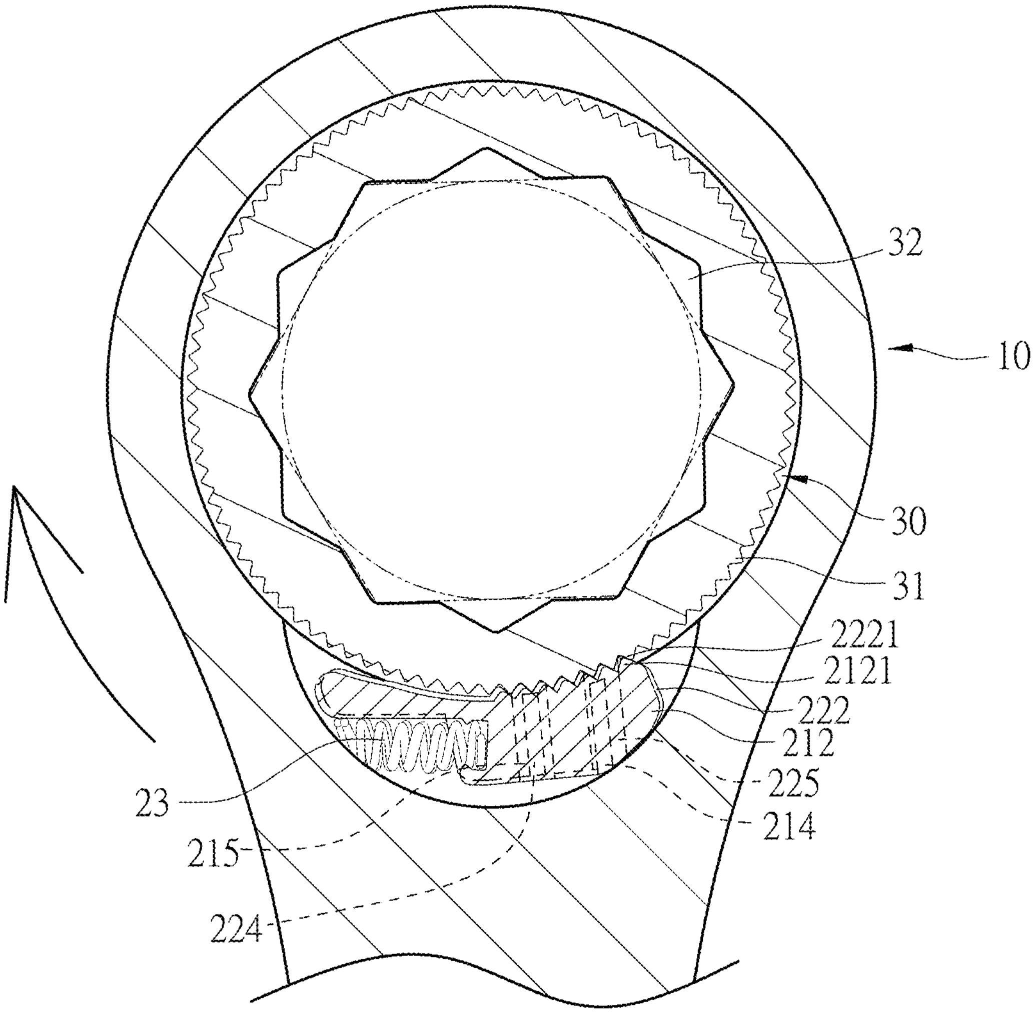
FIG. 9 is a schematic drawing of the second pawl member and the ratchet engaging for the locking operation according to the present invention.

Furthermore, after the main body 10 is twisted and reset and then apply clockwise force, as shown in FIG. 9, the ratchet 30 generates a counterclockwise reaction force, causing the first and second pawl members 21, 22 lose the clockwise rotation force and allows the spring member 23 to rebound and reset, and then one of the toothed section 212, 222 of the first and second pawl member 21, 22 quickly engages the equiangular teeth 31 of the ratchet 30. FIG. 9 shows the the engagement between the second pawl member 22 and the ratchet 30, and through the clearance between the fitting columns 214, 224 and the engaging groove 215, 225, the first and second pawl member 21, 22 are capable of moving and restraining each other to limit the displacement of the first and second pawl members 21, 22, and driving the ratchet 30 at a small angle, and as the main body 10 rotates clockwise to achieve the locking operation of the workpiece nut.

In addition, when the first and second pawl members 21 and 22 compress the spring member 23 due to the counterclockwise rotation of the main body for disengagement, the curved sections 213, 223 of the first and second pawl members 21, 22 are lower than the toothed sections 212 and 222, such that the curved sections 213, 223 of the first and second pawl members 21, 22 are closer to the equiangular teeth 31, thereby reducing the space between the ends of the curved section 213, 223 of the first and second pawl members 21, 22 and the inner wall of the containing space 12, so that the spring member 23 is tightly limited in the assembly slot 216, 226 and the spring member 23 is effectively prevented from slipping and popping out.

With the structure of the above specific embodiment, the following benefits can be obtained: (1) The fitting columns 214, 224 and the engaging groove 215, 225 are provided on the adjacent surfaces of the first and second pawl members 21, 22, such that when the pawl unit 20 is assembled, through the cooperation of the fitting columns 214, 224 and the engaging groove 215, 225, the first and second pawl members 21, 22 with a half of a tooth distance apart with each other, can be combined, this combination prevents from losing the small-angle gear change driving effect, improves the accuracy of structural composition and use, and reduces yield problems caused by human factors.

(2) The space of the engaging groove 215, 225 of the first and second pawl members 21, 22 is larger than the size of the fitting column 214, 224. When the first and second pawl members 21, 22 are displaced from each other, the engaging grooves 215, 225 limit the displacement range of the fitting convex portions 214, 224, thereby limiting the dislocation state between the first and second pawl members 21, 22, which helps to improve the stability of the pawl unit 20 in driving the ratchet 30 at a small angle.

(3) The first and second pawl members 21, 22 of the pawl unit 20 both have the toothed section 212, 222 and the curved section 213, 223, with the assembly slot 216, 226 on the bottom of the curved section 213, 223 secure the spring member 23, the volume and components of the pawl unit 20 are effectively reduced, so that it can be installed in the containing space 12 in a simpler manner, and the other end of the spring member 23 can directly abut against The inner wall of the containing space 12 which achieves the telescopic effect of linear compression and expansion, improving the accuracy of the movement of the first and second pawl members 21 and 22, thereby achieving the purpose of small-angle gear change drive.

Although the present invention has been explained in relation to its preferred embodiment, it is to be understood that many other possible modifications and variations can be made without departing from the spirit and scope of invention as hereinafter claimed.

What is claimed is:

1. A unidirectional dual pawl ratchet wrench comprising:

a main body comprising a driving space having a curved containing space;

a pawl unit comprising a first pawl member and a second pawl member each coupled with a respective spring member and mounted in the containing space;

each spring member abuts an end of the containing space, and the first and second pawl members have a respective abutting end pushing against another end of the containing space;

one end of each of the first and second pawl members is curved and has a toothed section and a curved section, the toothed sections of both of the first and second pawl members being different from each other by at least a half width of one tooth such that the toothed sections of both of the first and second pawl members are in staggered arrangement when the first and second pawl members are aligned with each other;

each of the toothed sections has a plurality of equiangular teeth and a non-equiangular tooth adjacent to the curved section;

adjacent sides of the first and second pawl members respectively having a fitting column and an engaging groove, wherein each engaging groove of one of the first and second pawl members accepts a respective fitting column of another one of the first and second pawl members for assembling the first and second pawl members together; wherein the engaging grooves and the fitting columns limit only half a tooth distance of relative movement between the first and second pawl members; and a ratchet comprising a plurality of equiangular teeth on an outer periphery and a driving hole, the ratchet further comprising an engaging ring groove at one end coupled with a C-shaped buckle for securing the ratchet in the driving space, and the equiangular teeth of the ratchet selectively engage with one of the toothed sections of the first and second pawl members.

2. The unidirectional dual pawl ratchet wrench as claimed in claim 1, wherein the non-equiangular tooth of each toothed section has an addendum angle larger than an addendum angle of the equiangular teeth of the toother section, and an addendum height that is lower than an addendum height of the equiangular teeth of the toothed section.

3. The unidirectional dual pawl ratchet wrench as claimed in claim 1, wherein for both the first pawl member and the second pawl member, arcs of the curved section and the toothed section are not identical, and the curved section is lower than the toothed section.

4. The unidirectional dual pawl ratchet wrench as claimed in claim 1, wherein the first and second pawl member each have an assembly slot below the curved section, the assembly slot is further extended as a hook corresponding to a protrusion on an upper surface of the assembly slot, and the hook and the protrusion together secure one end of the spring member to limit the spring member in the assembly slot.

* * * * *